United States Patent
Nakakita et al.

(10) Patent No.: US 6,386,305 B2
(45) Date of Patent: *May 14, 2002

(54) PROPULSION MOTOR CONTROL APPARATUS FOR BATTERY VEHICLE

(75) Inventors: Osamu Nakakita; Tatsuyuki Amamiya; Yoshimi Okazaki, all of Sagamihara (JP)

(73) Assignee: Tsubishi Heavy Industries, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,190

(22) Filed: Feb. 25, 1999

(30) Foreign Application Priority Data

Aug. 24, 1998 (JP) .......................................... 10-237733

(51) Int. Cl.⁷ .............................................. B62D 61/06
(52) U.S. Cl. ...................................... 180/65.8; 180/216
(58) Field of Search ............................... 180/65.1, 65.8, 180/908, 215, 216; 701/22, 69, 72; 477/2, 3; 318/255, 268

(56) References Cited

U.S. PATENT DOCUMENTS

| | | | |
|---|---|---|---|
| 4,320,810 A | | 3/1982 | Hillmann et al. |
| 4,471,273 A | * | 9/1984 | Melocik et al. ............... 701/22 |
| 4,801,855 A | * | 1/1989 | Nohmi et al. ................ 318/268 |
| 5,022,476 A | * | 6/1991 | Weege ....................... 180/65.1 |
| 5,206,574 A | * | 4/1993 | Okamoto et al. ............ 318/268 |
| 5,343,974 A | * | 9/1994 | Rabek ......................... 180/216 |
| 5,383,528 A | * | 1/1995 | Nicol ........................... 180/215 |
| 5,465,806 A | * | 11/1995 | Higasa et al. ............... 180/65.1 |
| 5,743,347 A | * | 4/1998 | Gingerich ................... 180/65.1 |
| 5,813,487 A | * | 9/1998 | Lee et al. ................... 180/65.1 |
| 5,923,096 A | * | 7/1999 | Manak ....................... 180/65.1 |

FOREIGN PATENT DOCUMENTS

| | | | | |
|---|---|---|---|---|
| EP | 0 794 104 A2 | | 9/1997 | |
| IT | 459759 | * | 10/1950 | ................. 180/215 |
| JP | 64317 | * | 6/1978 | ................. 180/216 |
| JP | 76316 | * | 7/1978 | ................. 180/65.8 |
| JP | 153904 | * | 11/1981 | ................. 180/65.8 |
| JP | 10-094114 | | 4/1998 | |

* cited by examiner

*Primary Examiner*—Frank Vanaman
(74) *Attorney, Agent, or Firm*—Oblon, Spivak, McClelland, Maier & Neustadt, P.C.

(57) ABSTRACT

A propulsion motor control apparatus for a battery vehicle including; a steering angle detection device for detecting a steering angle subtended between a common axis of two front wheels, and an axis of a rear wheel. Also included is a ratio computing device for computing a ratio between a distance between an intersection point of the two axes and a front wheel (outer wheel) on a side further from the intersection point, and a distance between the intersection point and a front wheel (inner wheel) on a side closer to the intersection point, based on the steering angle, a function determining device for determining a motor rotation speed/current command value function for the inner wheel based on a motor rotation speed/current command value function for the outer wheel and the obtained ratio, and a control device for individually controlling the respective propulsion motors for the two front wheels based on the two functions.

4 Claims, 7 Drawing Sheets

1: BATTERY
2: ACCELERATOR
3: PROPULSION MOTOR CONTROL APPARATUS
4A, 4B: PROPULSION MOTOR
5: TRANSMISSION UNIT
6: ROTATION SENSOR
12a: OUTER WHEEL (FIRST FRONT WHEEL)
12b: INNER WHEEL (SECOND FRONT WHEEL)
21: ANGLE SENSOR (STEERING ANGLE DETECTION DEVICE)
22: RATIO COMPUTING SECTION (RATIO COMPUTING DEVICE)
23: FUNCTION DETERMINING SECTION (FUNCTION DETERMINING DEVICE)
24: CONTROL SECTION (CONTROL DEVICE)

FIG.2

| | |
|---|---|
| 11; | BATTERY FORKLIFT |
| 12a; | OUTER WHEEL |
| 12b; | INNER WHEEL |
| 13; | REAR WHEEL |
| $\theta$; | STEERING ANGLE |
| $X_1$, $X_2$; | AXIS |
| A, B; | DISTANCE |
| C; | INTERSECTION POINT |

D; POINT
E; INTERSECTION POINT
$F_1$, $F_2$; MOTOR RPM /CURRENT COMMAND VALUE FUNCTION
O; ORIGIN
L; STRAIGHT LINE
$I_1$, $I_2$; CURRENT COMMAND VALUE
$R_1$, $R_2$; MOTOR RPM

PROPULSION MOTOR CONTROL APPARATUS FOR BATTERY VEHICLE

BACKGROUND OF THE INVENTION

1. Field of the Invention

The present invention relates to a propulsion motor control apparatus for a battery vehicle, and in particular to a propulsion motor control apparatus for a battery vehicle, ideally suited for use in a battery vehicle such as a battery forklift, which can realize optimum turning performance by improving feel during turning and turning efficiency even at low speeds.

2. Description of the Related Art

Figure 5:
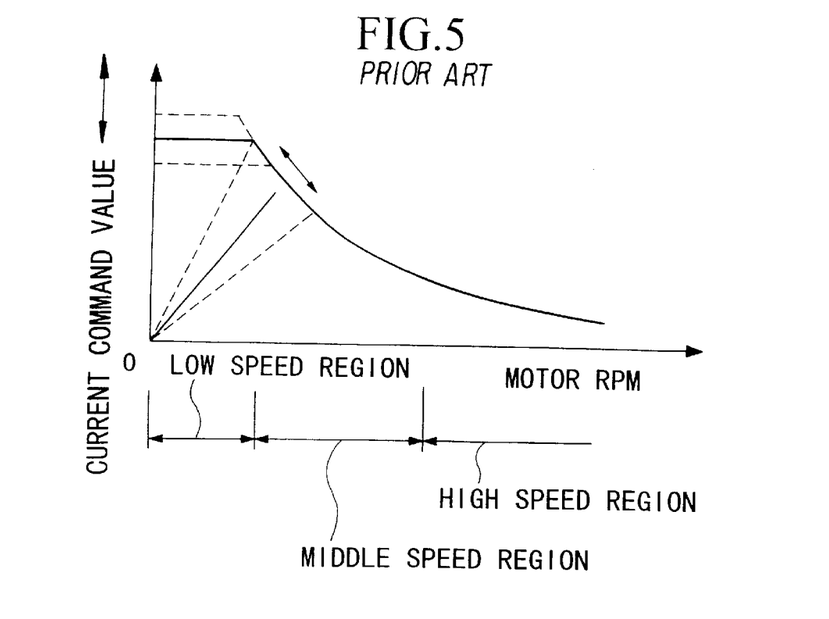
FIG. 5 is a diagram showing an example of a motor rotation speed/current command value function for a propulsion motor control apparatus of a conventional battery forklift.
Figure 6:
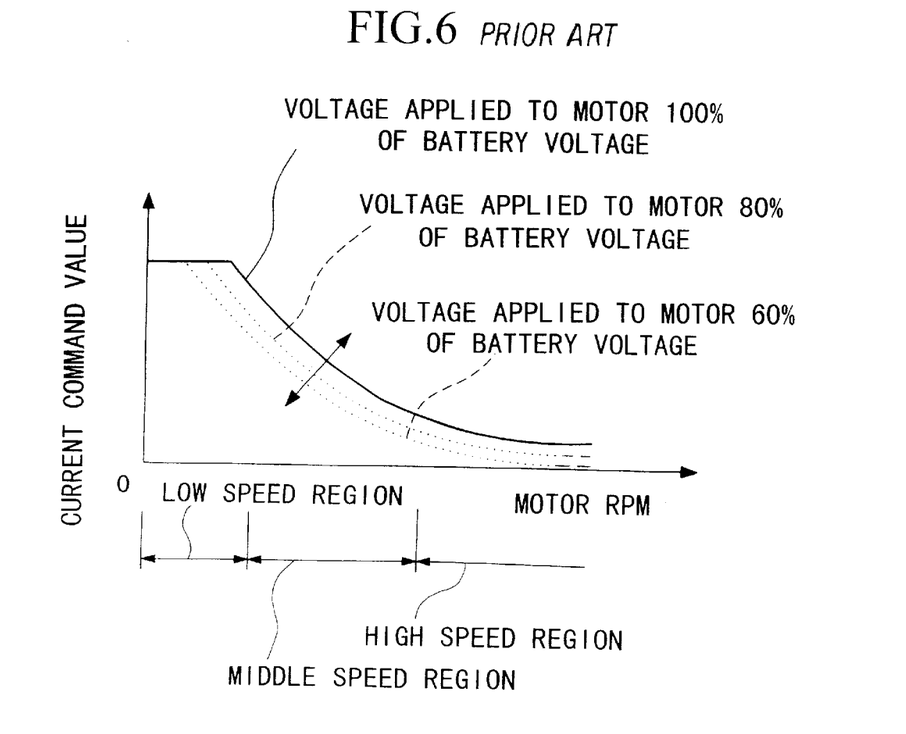
FIG. 6 is a diagram showing another example of a motor rotation speed/current command value function for a propulsion motor control apparatus of a conventional battery forklift.

FIG. 5 shows an example of a motor rotation speed/current command value function for a conventional propulsion motor control apparatus for a battery forklift, and FIG. 6 shows another example of a motor rotation speed/current command value function for a conventional propulsion motor control apparatus for a battery forklift.

Here the battery forklift is a vehicle which is propelled with a battery as the power source. With this battery forklift, the two front wheels have a common axis, and vehicle propulsion is controlled by individually controlling propulsion motors provided for each front wheel.

As a means for adjusting the propulsion performance (propulsion feeling) of such a battery forklift, then as shown in FIG. 5, there is a device which effects adjustment, by increasing or decreasing a motor current limit value in the low speed region, or by changing the rising slope of the motor current value in the low speed region. Moreover, as another adjustment means, then as shown in FIG. 6, there is a device which makes the voltage applied to the motor in the middle speed region to high speed region constant by controlling a duty ratio of a PWM voltage with a battery voltage at 100%, to give for example 80% or 60% of the battery voltage.

However, with the conventional propulsion motor control apparatus for a battery forklift as described above, various problems arise. For example, if the battery consumption, which is an important element of a battery forklift, is to be reduced, then if as shown in FIG. 5, the current in the low speed region is reduced, then the uphill power will be insufficient. Moreover, if as shown in FIG. 6, the fixed duty applied to the motor in the mid speed and high speed region is reduced, then the optimum speed will not be output.

Therefore, the present inventor has proposed a control apparatus for a motor with a battery power source, which can obtain a sufficient output torque in the low speed region and which can at the same time reduce the battery consumption as much as possible, while ensuring a predetermined optimum speed (refer to Japanese Patent Application, First Publication, No. Hei 10-94114).

Figure 7:
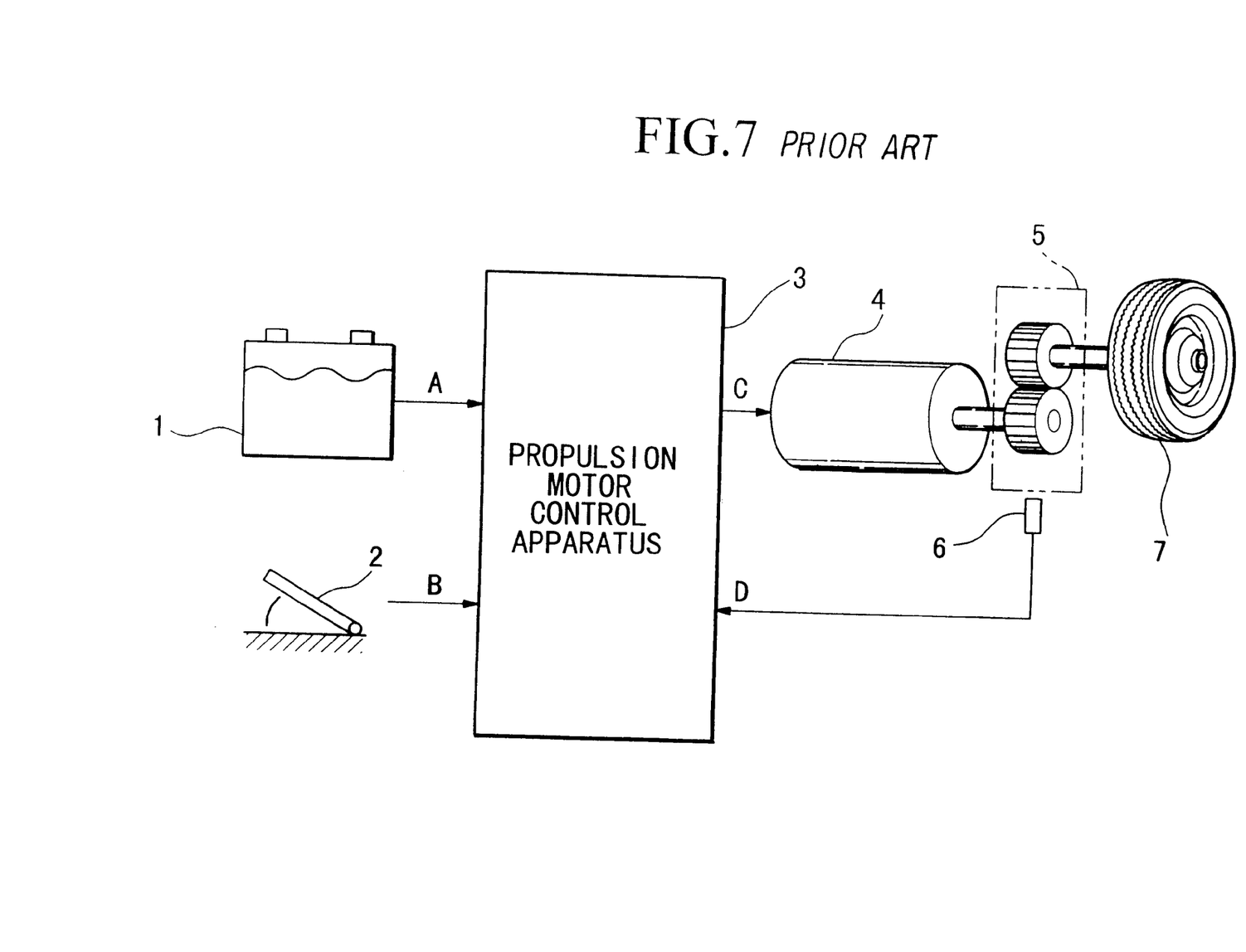
FIG. 7 is a schematic diagram showing a conventional three wheel battery forklift with two propulsion motors.

FIG. 7 is a schematic diagram illustrating a three wheel battery forklift with two propulsion motors to which this control apparatus for a motor with a battery power source is applied. In FIG. 7, numeral 1 denotes a battery, 2 an accelerator, 3 a propulsion motor control apparatus, 4 a propulsion motor, 5 a transmission unit, 6 a rotation sensor for detecting the rotation speed of the propulsion motor 4, and 7 a front wheel of the forklift. Here for convenience sake, only one front wheel 7 is shown. The other front wheel which is driven independently of this front wheel 7, is omitted from the figure.

Figure 8:
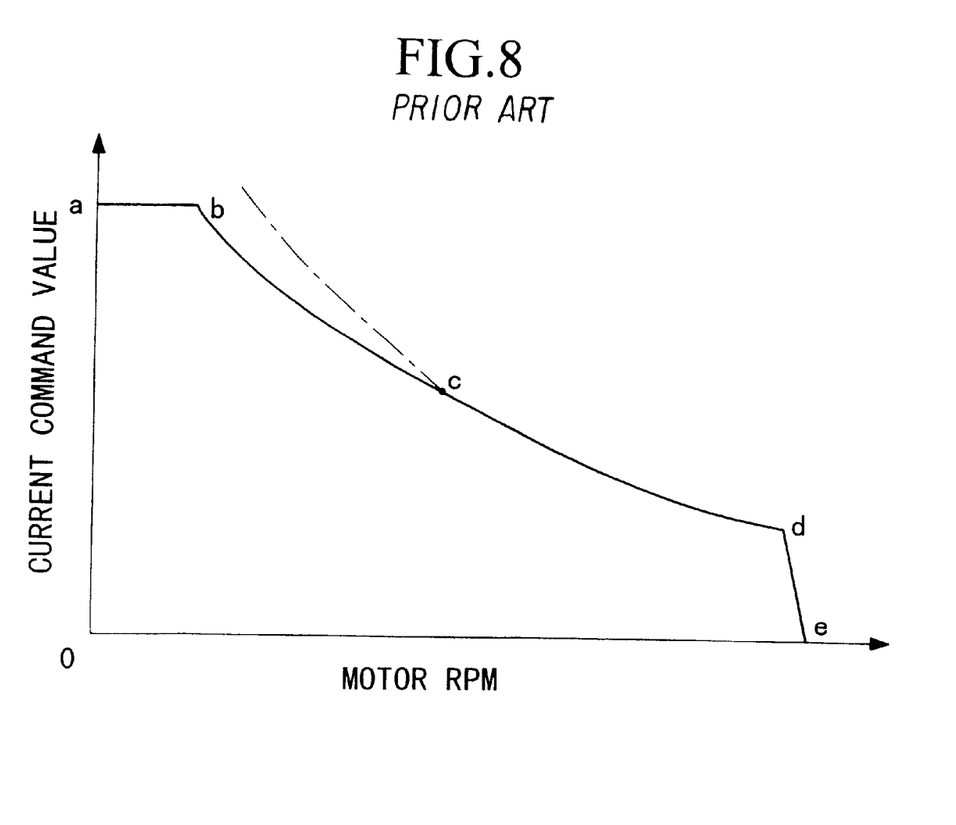
FIG. 8 is diagram showing an example of a motor rotation speed/current command value function for a conventional three wheel battery forklift with two propulsion motors.

FIG. 8 is a diagram showing an example of a motor rotation speed/current command value function for when an accelerator division in the battery forklift is at a maximum. This function is determined as follows.

(1) Point (a) is determined from the specifications for maximum pulling power (uphill power) required for the battery forklift.

(2) Point (c) is suitably determined in the mid speed region of the rotational speed range of the propulsion motor 4 (horizontal axis in FIG. 8), with an intersection point of the rating current of the propulsion motor 4 and the motor rating output curve (the curve shown by the chain line in FIG. 8) as a criterion. A condition here is that, with the point (c), the chopper duty is at 100%, that is to say the battery power source voltage is applied to the propulsion motor 4.

(3) Point (b) is a point on a straight line drawn parallel to the horizontal axis from the point (a), and is the point that gives the same value battery current flow in the low speed region of the rotational speed range of the propulsion motor 4, as the battery current at the point (c).

That is to say, in the low speed region, even in the case where the motor current (current command value) is large, it is possible to make the current supplied by the battery 1 have the same value. The reason is that the current flows continuously via a free wheel diode of a chopper circuit for inertia of the propulsion motor 4. Consequently, in this case, even if the duty is for example around 50%, a motor current of a current command value corresponding to the point (a) can be obtained.

The characteristic curve from (b) to (c) may be determined in accordance with the above-mentioned determination method for the point (b).

(4) Point (d) is a point on the rating output curve for the propulsion motor 4, and is the point corresponding to the limit speed of the propulsion motor 4, that is to say to the limit speed of the battery forklift.

Here the characteristic curve from (c) to (d) coincides with the rated output curve of the propulsion motor 4.

(5) Point (e) is a point corresponding to a pre-load of the battery forklift.

After determining the motor rotation speed/current command value function for the battery forklift by such a method, the motor rotation speed/current command value function corresponding to respective accelerator divisions is determined so as to obtain the desired torque and speed with respect to accelerator opening.

With the motor rotation speed/current command value function determined in this way, then of course a desired maximum torque can be obtained. Moreover, in going from the low speed region to the middle speed region, that is from point (b) to point (c), by keeping the duty of the chopper circuit as small as possible, then the battery consumption can be controlled.

Furthermore, while the characteristic curve from point (c) to point (d) is the rated output characteristic for the propulsion motor 4, the propulsion motor 4 is controlled to ensure a maximum speed, by reducing the current command value from point (d) to point (e)

Moreover, with the above described conventional battery forklift, since the voltage is controlled by duty controlling the propulsion motor 4, then the current value for the propulsion motor 4 is determined from the current which gives a balance at the before-mentioned duty ratio voltage corresponding to the steering angle, that is the angle subtended between the common axis of the two front wheels and the axis of the rear wheel. Consequently, at low speeds, the characteristic curves of the front wheel on the inside when turning (referred to hereunder as the inner wheel) and of the front wheel on the outside (referred to hereunder as the outer wheel) overlap, and hence both the inner and outer wheels have the same current value. Therefore, an undesirable influence is exerted on the feel during turning. Moreover, there is the problem of a reduction in turning efficiency attributable to friction etc. of the rear wheel.

SUMMARY OF THE INVENTION

The present invention takes into consideration the above situation with the object of providing a propulsion motor control apparatus for a battery vehicle, which can improve the feel during turning and the turning efficiency even at low speeds, and thus realize optimum turning performance.

In order to address the above problems, the propulsion motor control apparatus for a battery vehicle according to the present invention, being an apparatus which controls propulsion of a battery vehicle with a battery as a power source by individually controlling respective propulsion motors provided for two front wheels having a common axis, comprises; a steering angle detection device for detecting a steering angle subtended between the common axis of the two front wheels and an axis of a rear wheel, a ratio computing device for computing a ratio between a distance between an intersection point of the two axes and a first front wheel on a side further from the intersection point, and a distance between the intersection point and a second front wheel on a side closer to the intersection point, based on the steering angle, a function determining device for obtaining a motor rotation speed/current command value function for the second front wheel based on the motor rotation speed/current command value function for the first front wheel and the obtained ratio, and a control device for individually controlling the respective propulsion motors for the two front wheels based on the two functions.

With the propulsion motor control apparatus for a battery vehicle according to the present invention, since this comprises; the steering angle detection device for detecting the steering angle subtended between the common axis of the two front wheels, and the axis of the rear wheel, the ratio computing device for computing the ratio between the distance between the intersection point of the two axes and the first front wheel on the side further from the intersection point, and the distance between the intersection point and the second front wheel on the side closer to the intersection point, based on the steering angle, the function determining device for obtaining the motor rotation speed/current command value function for the second front wheel based on the motor rotation speed/current command value function for the first front wheel and the obtained ratio, and the control device for individually controlling the respective propulsion motors for the two front wheels based on the two functions, then by outputting current command values independent of each other respectively for the first front wheel and the second front wheel, corresponding to the steering angle, the respective propulsion motors for the two front wheels can be individually controlled. Consequently, the feel during turning and the turning efficiency at low speeds can be improved, and optimum turning performance can be realized.

DESCRIPTION OF THE PREFERRED EMBODIMENT

An embodiment of a propulsion motor control apparatus for a battery vehicle according to the present invention will now be described with reference to the drawings.

Figure 1:
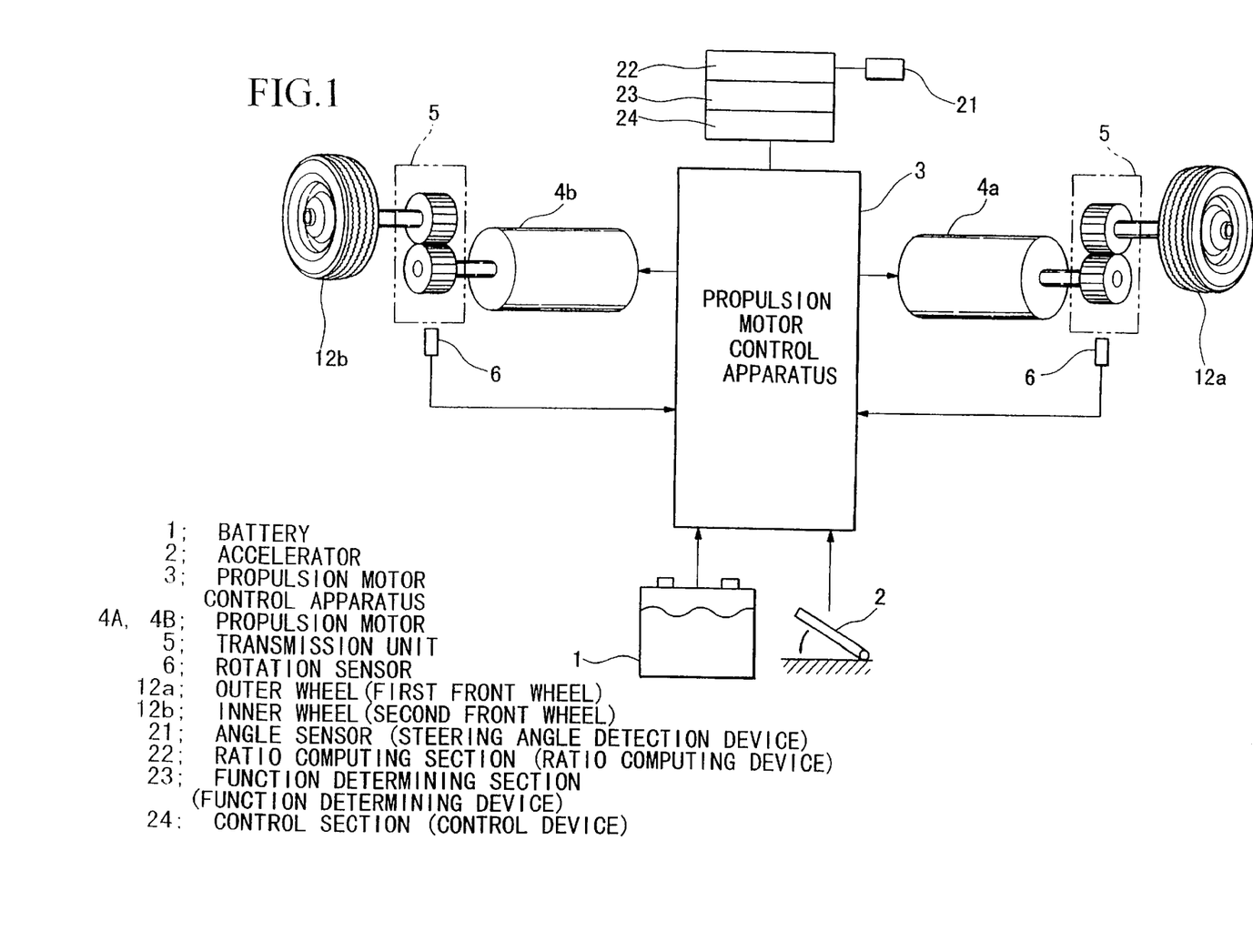
FIG. 1 is a schematic diagram showing a three wheel battery forklift with two propulsion motors, according to an embodiment of the present invention.
Figure 2:
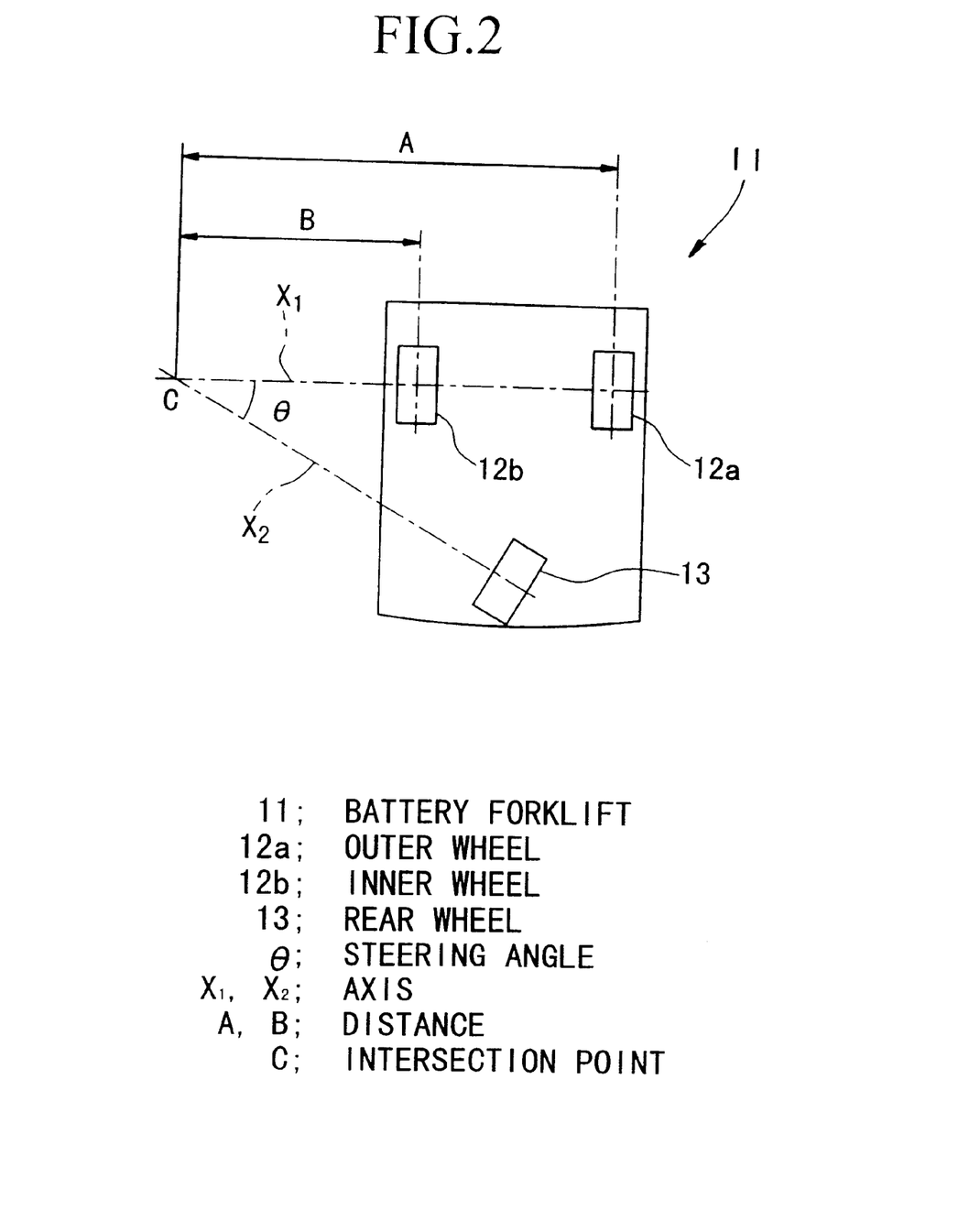
FIG. 2 is an under surface view illustrating the positional relation between the front wheels and rear wheel of a battery forklift of the embodiment of the present invention.
Figure 3:
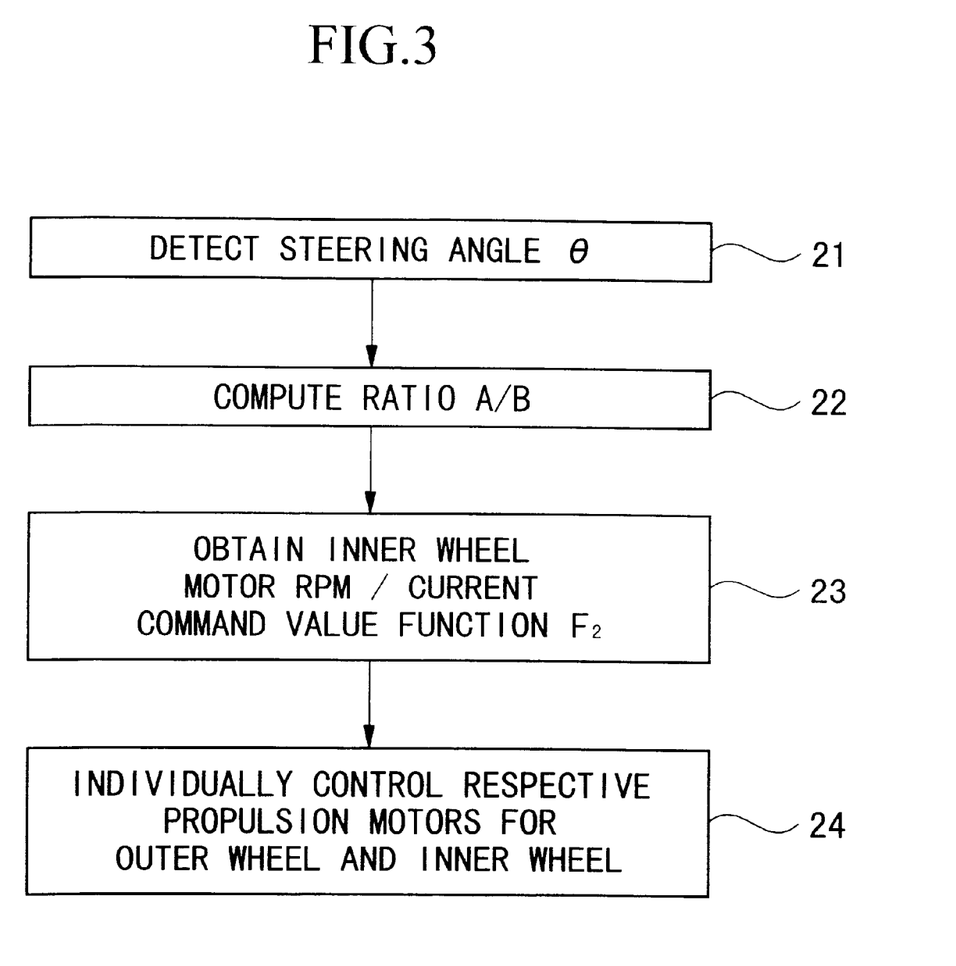
FIG. 3 is flow chart illustrating the operation of a propulsion motor control apparatus for a battery forklift of the embodiment of the present invention.

FIG. 1 is a schematic diagram showing a three wheel battery forklift with two propulsion motors, according to the embodiment of the present invention, FIG. 2 is an under surface view illustrating the positional relation between the front wheels and rear wheel of the battery forklift, and FIG. 3 is flow chart illustrating the operation of a propulsion motor control apparatus for the battery forklift.

The point where the construction of this battery forklift differs from the construction of the above-mentioned conventional battery forklift is that, with the propulsion motor control apparatus 3, there is provided; an angle sensor 21 (steering angle detection device) for detecting a steering angle $\theta$ subtended between an axis $X_1$ common with an outer wheel (first front wheel) 12a and an inner wheel (second front wheel) 12b of a battery forklift 11, and an axis $X_2$ of a rear wheel 13, a ratio computing section (ratio computing device) 22 for computing a ratio A/B between a distance A from an intersection point C of the axis $X_1$ and the axis $X_2$ to the center of the outer wheel 12a, and a distance B from the intersection point C to the center of the inner wheel 12b, based on the steering angle $\theta$, a function setting section (function setting device) 23 for obtaining a motor rotation speed/current command value function for the inner wheel 12b based on the obtained motor rotation speed/current command function for the outer wheel 12a and the obtained ratio A/B , and a control section (control device) 24 for individually controlling the propulsion motor 4a of the outer wheel 12a, and the propulsion motor 4b of the inner wheel 12b, based on the two functions.

With this propulsion motor control apparatus, as shown in FIG. 3, the steering angle $\theta$ subtended between the axis $X_1$ common with the outer wheel 12a and the inner wheel 12b, and the axis $X_2$ of the rear wheel 13, is detected by the angle sensor 21. Then by means of the ratio computing section 22, the ratio A/B between the distance A from the intersection point C of the axis $X_1$ and the axis $X_2$ to the center of the outer wheel 12a, and the distance B from the intersection point C to the center of the inner wheel 12b is computed based on the steering angle $\theta$. Here, by intentionally changing the steering angle θ, that is to say the ratio A/B, then the vehicle stability, and feeling, such as under-steering and over-steering can be set to the optimum condition.

Figure 4:
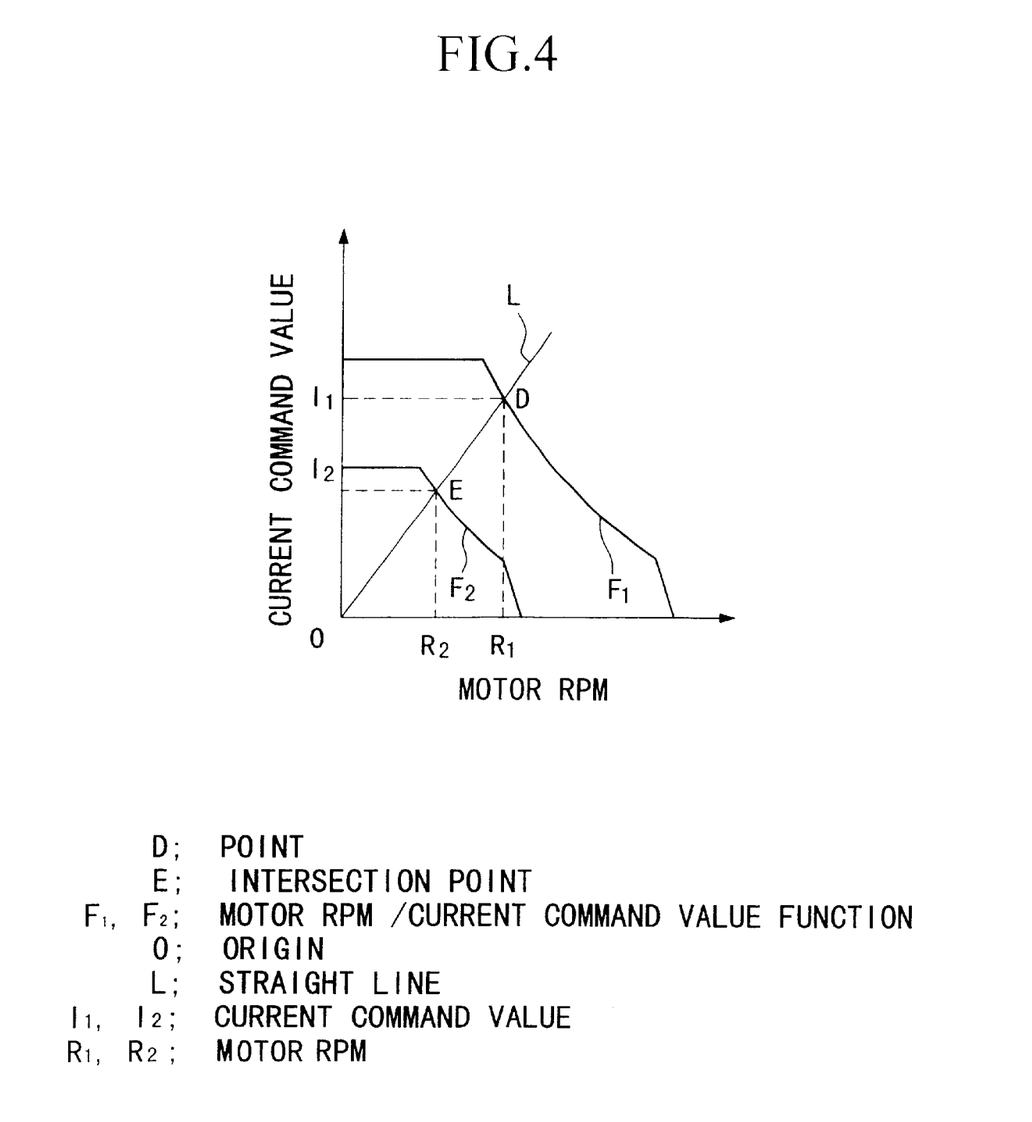
FIG. 4 is a diagram showing motor rotation speed/current command value functions for respective outside and inside wheels according to the embodiment of the present invention.

Then, as shown in FIG. 4, by means of the function setting section 23, the motor rotation speed/current command value function $F_2$ for the inner wheel 12b is obtained, based on the motor rotation speed/current command value function $F_1$ for the outer wheel 12a and the ratio A/B obtained from the ratio computing section 22. This motor rotation speed/current command value function $F_2$ is of a shape approximately resembling the motor rotation speed/current command value function $F_1$ for the outer wheel 12a.

Next, by means of the control section 24, the respective propulsion motors 4 of the outer wheel 12a and the inner wheel 12b are individually controlled based on the motor rotation speed/current command value function $F_1$, for the outer wheel 12a and the motor rotation speed/current command value function $F_2$ for the inner wheel 12b. More specifically, a line L is drawn through the origin θ and a point D on the motor rotation speed/current command value function $F_1$, corresponding to the current command value $I_1$ of the outer wheel 12a, and an intersection point E of the line L and the motor rotation speed/current command value function $F_2$ is obtained to thereby obtain a current command value 12 for the inner wheel 12b corresponding to this intersection point E.

Here, the motor rotation speed/current command value function $F_1$, for the outer wheel 12a, and the motor rotation speed/current command value function $F_2$ for the inner wheel 12b do not overlap each other. Therefore a current command value $I_1$ is output to the propulsion motor 4a of the outer wheel 12a, and a current command value $I_2$ which is different from the current command value $I_1$ is output to the propulsion motor 4b of the inner wheel 12b, thereby enabling the outer wheel 12a to be rotated at a motor rotation speed $R_1$, and the inner wheel 12b to be rotated at a motor rotation speed $R_2$ different from the motor rotation speed $R_1$. As a result, the outer wheel 12a and the inner wheel 12b rotate at rotation speeds different from each other.

In this way, independent current command values are respectively output to the propulsion motor 4a of the outer wheel 12a and the propulsion motor 4b of the inner wheel 12b, thereby enabling the propulsion motor 4a of the outer wheel 12a and the propulsion motor 4b of the inner wheel 12b to be individually controlled. Consequently, even at low speeds, and during the time of deceleration the motor rotation speed/current command value function $F_1$ for the outer wheel 12a and the motor rotation speed/current command value function $F_2$ for the inner wheel 12b do not overlap each other, and hence the respective drives for the outer wheel 12a and the inner wheel 12b can be individually controlled at the torque and the rotation speed corresponding to the turning ratio A/B, so that the feel during turning, and turning efficiency are improved.

As described above, with the present embodiment, in the propulsion motor control apparatus 3 there is provided; the angle sensor 21 for detecting the steering angle θ subtended between the axis $X_1$ common with the outer wheel 12a and the inner wheel 12b, and the axis $X_2$ of the rear wheel 13, the ratio computing section 22 for computing the ratio A/B between the distance A from the intersection point C of the axis $X_1$ and the axis $X_2$ to the outer wheel 12a, and the distance B from the intersection point C to the inner wheel 12b, based on the steering angle θ, the function setting section 23 for obtaining the motor rotation speed/current command value function for the inner wheel 12b based on the obtained motor rotation speed/current command function for the outer wheel 12a and the obtained ratio A/B, and the control section 24 for individually controlling the propulsion motor 4a of the outer wheel 12a, and the propulsion motor 4b of the inner wheel 12b, based on the two functions. Hence the respective rotational speeds of the outer wheel 12a and the inner wheel 12b can be individually controlled.

Consequently, even at low speeds, the motor rotation speed/current command value function $F_1$ for the outer wheel 12a and the motor rotation speed/current command value function $F_2$ for the inner wheel 12b do not overlap each other. Hence it is possible to control at the torque and the rotation speed corresponding to the turning ratio A/B, so that the feel during turning, and turning efficiency for the outer wheel 12a and the inner wheel 12b at low speeds can be improved, enabling optimum turning performance to be realized. As a result, the heretofore problem with the inner and outer wheels both having the same current value, the problem with the feel during turning, and the drop in turning efficiency attributable to friction etc. of the rear wheel can be overcome.

In the above, one embodiment of a propulsion motor control apparatus for a battery vehicle according to the present invention has been described, based on the drawings. However the specific construction is not limited to the present embodiment, and designs and modifications etc. within a scope not deviating from the gist of the invention are also possible. For example the basic numerical values and ranges etc. for the steering angle θ and the ratio A/B can be suitably set as required.

What is claimed is:

1. A propulsion motor control apparatus for a battery vehicle including two front wheels having a common axis and a rear wheel, said apparatus comprising:

steering angle detection means for detecting a steering angle subtended between said common axis of the two front wheels and an axis of the rear wheel;

ratio computing means for computing a ratio, based on the detected steering angle, of a distance between an intersection point of said two axes and a first front wheel on a side further from said intersection point, and a distance between said intersection point and a second front wheel on a side closer to said intersection point;

function determining means for determining a second motor rotation speed/current command value function for said second front wheel based on a first motor rotation speed/current command value function for said first front wheel and said computed ratio; and control means for simultaneously individually controlling respective propulsion motors provided for said two front wheels based on said first and second motor rotation functions such that the first and second motor rotation speed/current command value functions for said first and second front wheels at low speeds do not have the same value and do not overlap.

2. A propulsion motor control apparatus for a battery vehicle according to claim 1, wherein said control means is for controlling the respective motor rotation speeds of said two front wheels independent of each other, based on respective current command values for said two front wheels.

3. A propulsion motor control apparatus for a battery vehicle including two front wheels having a common axis and a rear wheel, said apparatus comprising;

a steering angle sensor configured to detect a steering angle subtended between the common axis of the two front wheels and an axis of the rear wheel;

a ratio computing device configured to compute a ratio, based on the detected steering angle, of a distance between an intersection point of the two axes and a first front wheel on a side further from the intersection point, and a distance between the intersection point and a second front wheel on a side closer to the intersection point;

a function determining device configured to determine a second motor rotation speed/current command value function for the second front wheel based on a first motor rotation speed/current command value function for the first front wheel and the computed ratio; and a control device configured to simultaneously individually control respective propulsion motors provided for the two front wheels based on the first and second motor rotation functions such that the first and second motor rotation speed/current command value functions for the first and second front wheels at low speeds do not have the same value and do not overlap.

4. A propulsion motor control apparatus for a battery vehicle according to claim 3, wherein said control device is configured to control the respective motor rotation speeds of the two front wheels independent of each other, based on respective current command values for the two front wheels.

* * * * *

UNITED STATES PATENT AND TRADEMARK OFFICE
CERTIFICATE OF CORRECTION

PATENT NO.    : 6,386,305 B2                                    Page 1 of 1
DATED         : May 14, 2002
INVENTOR(S)   : Nakakita et al.

It is certified that error appears in the above-identified patent and that said Letters Patent is hereby corrected as shown below:

<u>Title page,</u>
Item [73], Assignee's information should read:
-- [73]   Assignee: Mitsubishi Heavy Industries, Ltd.,
                    Tokyo, (JP) --

Signed and Sealed this

First Day of October, 2002

*Attest:*

*Attesting Officer*

JAMES E. ROGAN
*Director of the United States Patent and Trademark Office*